Figure 1:
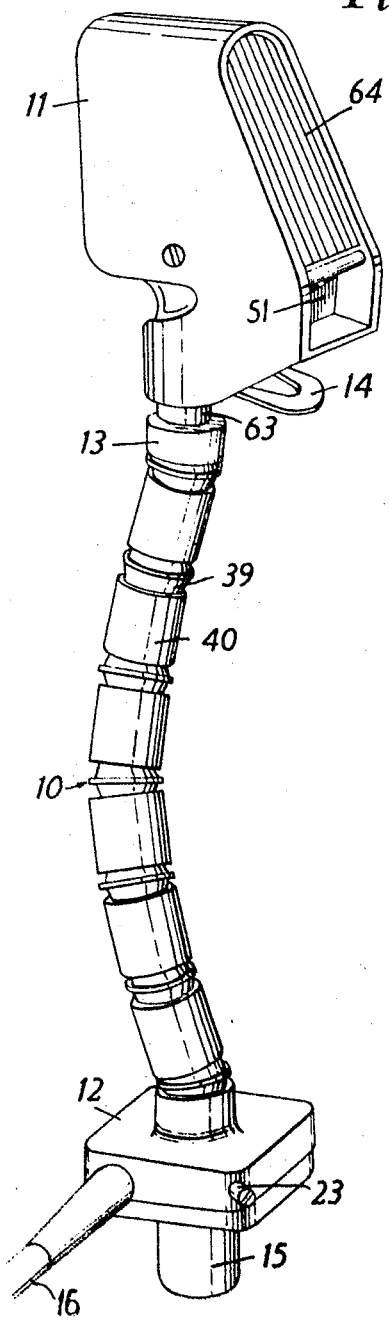

United States Patent

[11] 3,584,822

| [72] | Inventor | John A. Oram<br>Osborne Cottage, Heath Road, Leighton<br>Buzzard, Bedfordshire, England |
|---|---|---|
| [21] | Appl. No. | 797,054 |
| [22] | Filed | Feb. 6, 1969 |
| [45] | Patented | June 15, 1971 |
| [32] | Priority | Feb. 26, 1968 |
| [33] | | Great Britain |
| [31] | | 9263/68 |

[54] FLEXIBLE COLUMNS
18 Claims, 9 Drawing Figs.

[52] U.S. Cl................................................. 248/160,
240/52, 248/176, 248/276
[51] Int. Cl..........................................F16m 13/00
[50] Field of Search............................................ 248/160,
176, 274, 276; 287/86; 64/6, 7

[56] References Cited
UNITED STATES PATENTS

| 870,429 | 11/1907 | Grimler...................... | 248/160 |
| 912,308 | 2/1909 | Grimler...................... | 248/160 |
| 3,040,137 | 6/1962 | Simmons..................... | 248/160 |
| 3,096,962 | 7/1963 | Meijs.......................... | 248/276 |
| 3,168,274 | 2/1965 | Street.......................... | 248/176 |

FOREIGN PATENTS

| 1,255,099 | 1/1961 | France ....................... | 248/274 |

Primary Examiner—Marion Parsons, Jr.
Attorney—Sughrue, Rothwell, Mion, Zinn and MacPeak ABSTRACT: A flexible column suitable for supporting apparatus such as electric lamps has a series of ball-and-socket joints rigidly locked together by a tensioned cable, spring means being provided at the free end of the column to tension the cable, together with unlocking mechanism including a lever whereby the spring bias can be opposed to unlock the column.

PATENTED JUN 15 1971 3,584,822

SHEET 1 OF 5

FLEXIBLE COLUMNS

The present invention relates to flexible columns of the type embodying a series of ball-and-socket joints in which the balls are urged against seatings by means of a tensioned flexible cable passing through an aperture in each ball. It will be appreciated that each ball need not be a complete sphere but, of course, the region thereof which contacts a seating lies in a spherical surface.

Flexible columns of this type are sometimes referred to as articulated columns or "snakes." The joints usually have seatings in the form of hollow cylinders whose internal diameters are smaller than the ball diameters, so that each ball is seated in one end of an associated cylinder. In an improved version, the bearing surface of each cylinder, on which a ball is seated, is made conical. The cable is usually a flexible steel cable which passes through an aperture in each ball.

By means of an initial tension in the cable the forces between the balls and their associated sockets are arranged to be such that the column is locked. By reducing the tension in the cable with the aid of suitable mechanism, the column can be unlocked and when in this state can be bent readily into a variety of shapes and attitudes. When the column is locked, it remains rigid even if it is mounted on a vibrating surface, and hence columns of this type may be used for supporting apparatus on machine tools, thereby dispensing with apparatus such as stiff brackets which might otherwise be required.

It will be appreciated that the provision of mechanism for giving the required initial tension and for unlocking and locking the column presents some problems.

An object of the present invention is to provide a flexible column of the type hereinbefore defined with improved mechanism whereby locking and unlocking of the column and manual manipulation of the column can be facilitated.

According to the present invention there is provided a flexible column of the type hereinbefore defined having a termination at one end of the cable providing an abutment and a spring-loaded member so in contact with the termination as to tension the cable and lock the column, and unlocking mechanism operable to counteract at least in part the bias provided by the spring means which load the said member to unlock the column and permit adjustment thereof.

Known articulated columns are inconvenient to adjust since two hands are required, one to lock and unlock the column and one to bend it into the required attitude when it is unlocked. The unlocking mechanism of the present invention can include a manually operable lever arranged to act directly or indirectly on the spring means in such a manner that when the lever is released the spring loading of the said member is automatically restored to lock the column. Thus when it is necessary to bend the column, the lever is operated to reduce the initial tension in the cable sufficiently to unlock the column. By locating the lever at the end of the column remote from the base, only one hand is necessary to unlock, bend and relock the column. Furthermore, if the lever is accidentally released the column is automatically locked thereby eliminating the risk of the column collapsing into a moving part of a machine tool.

According to a subsidiary feature of the present invention the cable has a termination at the other end providing an abutment and a U-shaped saddle embracing the cable and abutting the termination, means being provided urging the saddle against the termination and thereby tensioning the cable.

By means of this feature an initial tension in the cable can readily be adjusted.

In many cases it is desirable to support electrical apparatus, for example a lamp, on such a flexible column and it will be apparent that it would be advantageous to enclose electrical leads inside the column. It will be appreciated, however, that if this is done, then not only must there be space available to accommodate the leads, but the column must be restrained from being twisted so much that the leads become detached from their connections or are damaged.

According to another subsidiary feature of the invention each ball has a further aperture and an electric lead passes through the further apertures, means being provided on one of the members of each ball-and-socket joint which project into means on the other member of the ball-and-socket joint adapted to limit relative rotation of the two members about the cable by engagement with the projection.

In known flexible columns of the type defined, when the column is bent the tension in the cable is increased. Clearly this would be disadvantageous in embodiments of the invention since the tension in the cable could increase to such an extent that the unlocking mechanism would become inoperative.

According to a further subsidiary feature of the present invention the aperture in each ball, through which the tensioned cable passes, is tapered from each end towards the center of the ball with the smaller diameter towards the center of the ball.

In known flexible columns of the type defined, a large tension must be applied to the cable in order to provide sufficiently high forces between the balls and associated sockets for locking the column. Consequently, the mating surfaces of the balls and their associated sockets are subject to wear and distortion, causing uneven adjustment of the column when unlocked. Also the cable tends to stretch, thereby decreasing the tension available for locking the column.

According to yet another subsidiary feature of the present invention, the bearing surfaces of the sockets, which can be made conical, are covered with a yielding material to increase the friction of the ball-and-socket joint.

It will be appreciated that if the friction between each ball and socket is increased, then the tension in the cable can be reduced, since the forces between the members of the ball-and-socket joints necessary for locking the column can be lower. Thus wear of the ball-and-socket joints and cable stretch is reduced. Furthermore the mating surfaces of the joints need not be accurately finished because of the accommodation provided by the yielding material.

Some machining operations require close supervision, and it is often necessary to illuminate the workpiece while examining it. For such purposes a lamp mounted on a flexible support of some kind is advantageous. However, the lamps at present available are bulky and often obstruct a machinist's view of the workpiece. Additionally, lamps which provide good illumination also generate considerable heat and as a result could burn if inadvertently touched.

Thus, a further object of the present invention is to provide a lamp assembly, mounted on a flexible column of the type hereinbefore defined, which provides a high output of light without becoming excessively hot during use.

According to yet another subsidiary feature of the present invention, a housing for an electric lamp is supported on the flexible column, the housing having a structure comprising a bulb holder attached to a reflector which constitutes a heat sink and has a plurality of cooling fins, the housing being so provided with openings that air can flow freely through the housing and over the fins of the heat sink.

According to a still further subsidiary feature of the present invention, the flexible column includes in a base thereof a clamp for an electric lead in which the insulating sleeve of the lead is deformed by the clamp, the clamp comprising at least three plates in each of which there is an aperture in which the lead is a close fit, the aperture in each plate being staggered relative to the aperture or apertures in the next adjacent plate or plates.

Figure 3:
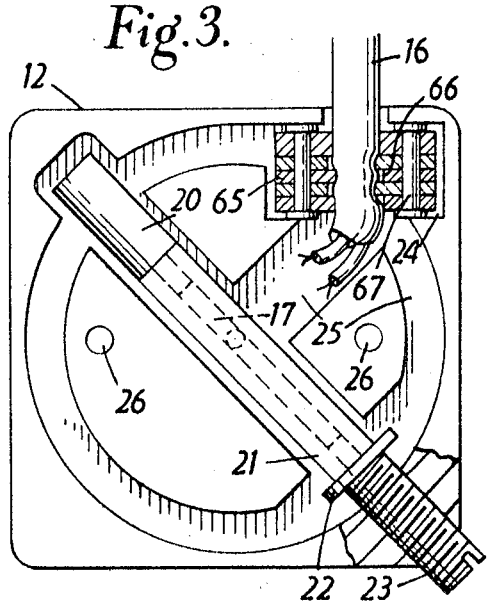
Figure 6:
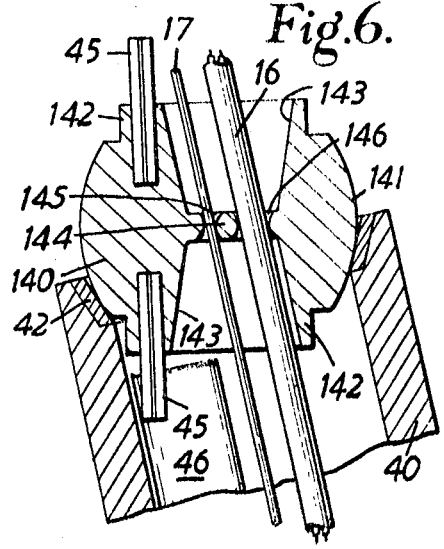
Figure 2:
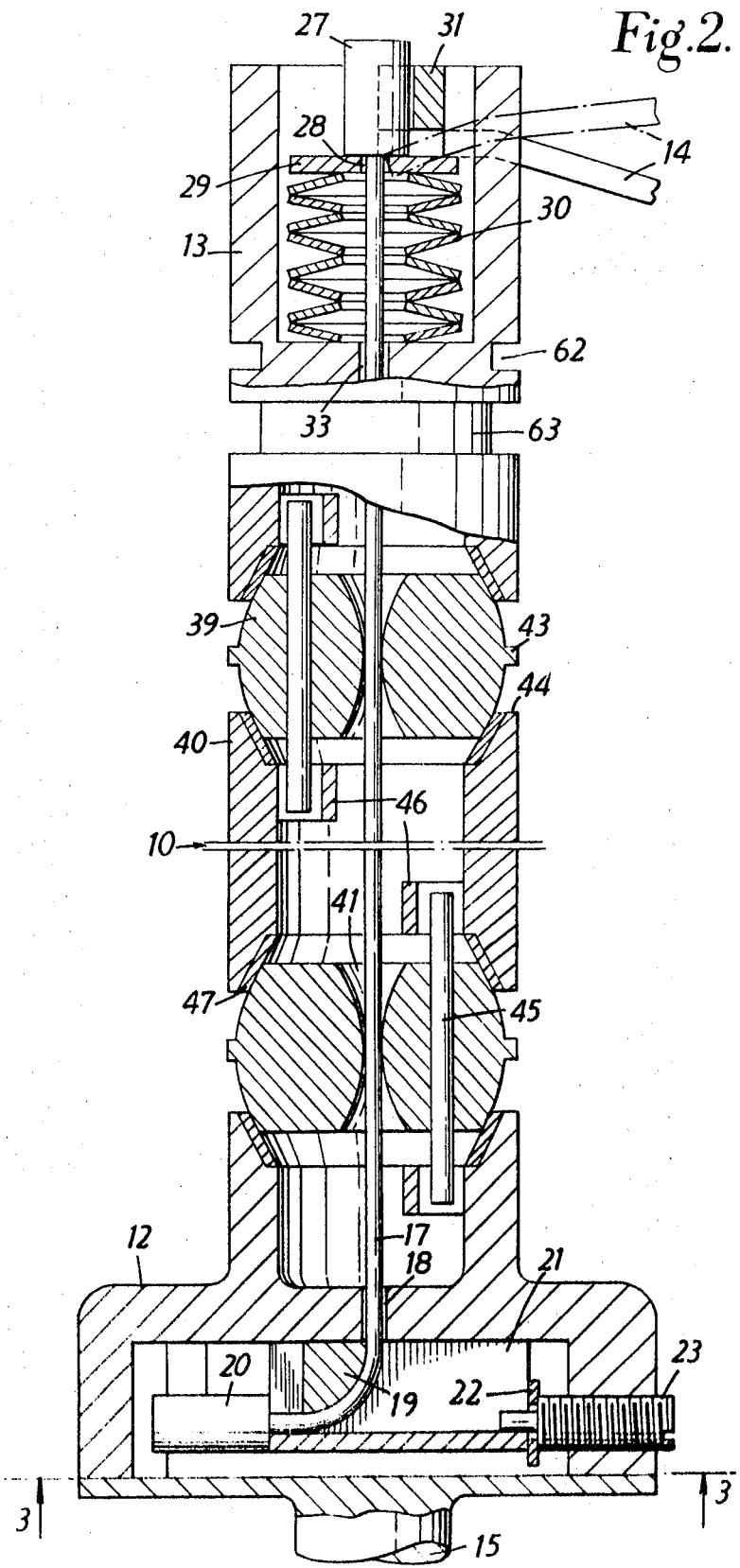
Figure 4:
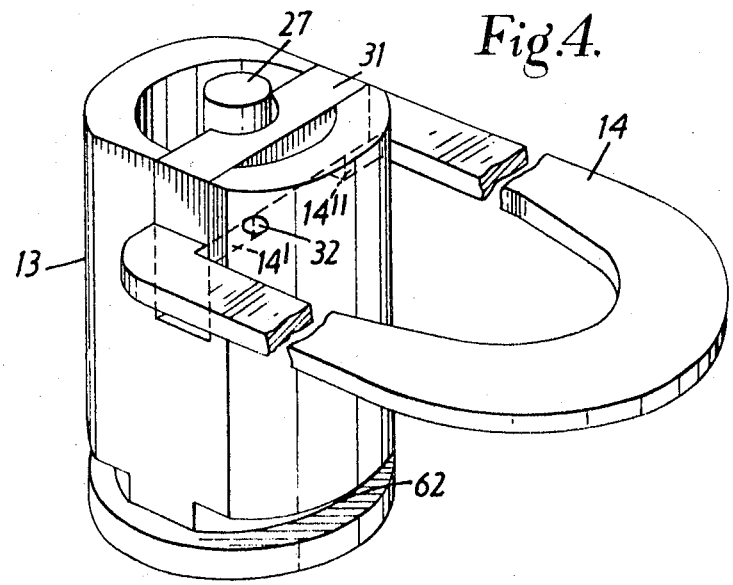
Figure 5:
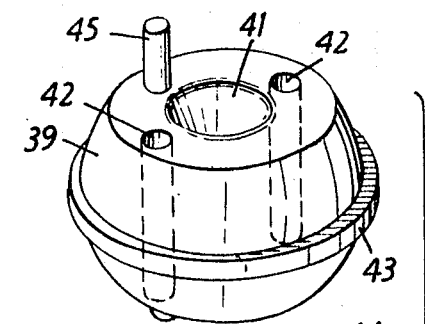
Figure 5:
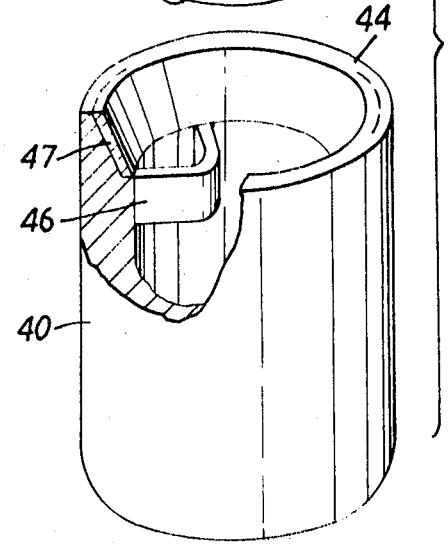
Figure 8:
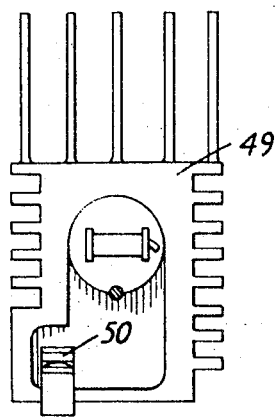
Figure 7:
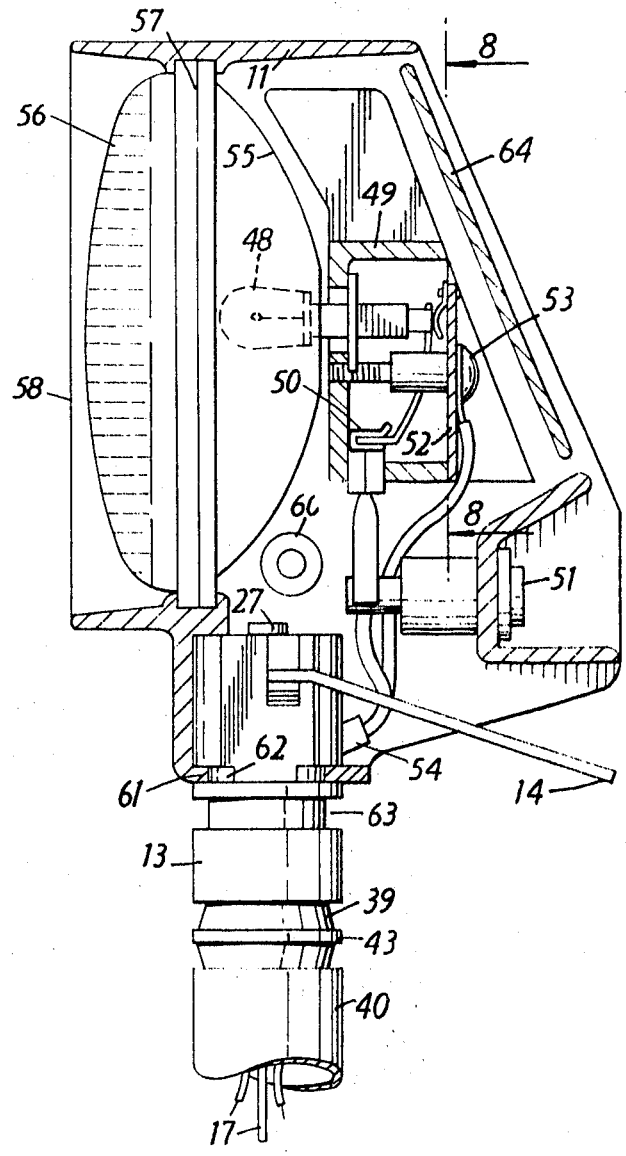
Figure 9:
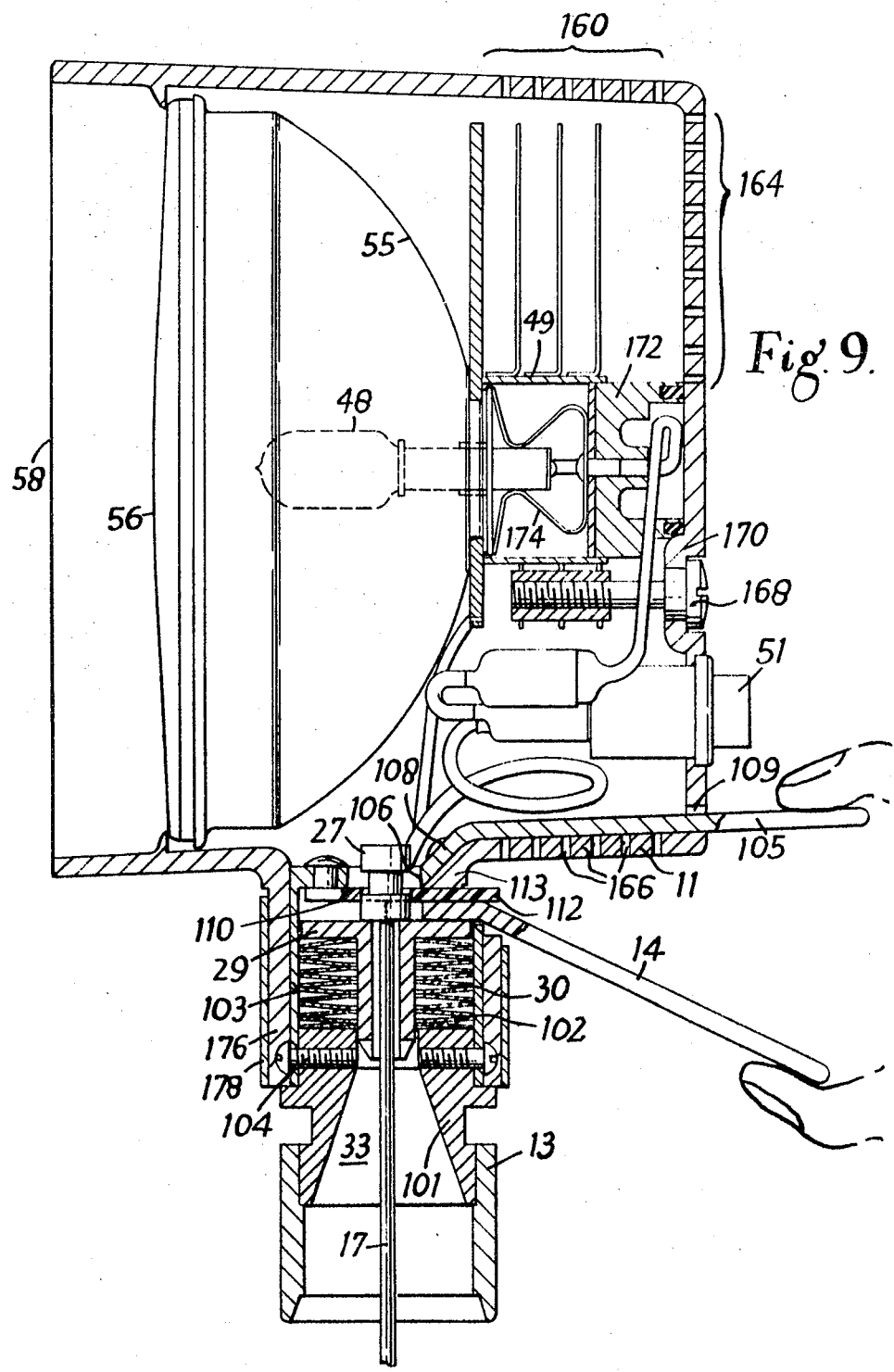

The present invention will now be described by way of example with reference to the accompanying drawings in which:

FIG. 1 is a drawing of a flexible column according to the present invention supporting a lamp-housing, FIG. 2 is a drawing partly in longitudinal cross section of the flexible column of FIG. 1, FIG. 3 is a sectional view of a base member taken along the line 3–3 of FIG. 2, FIG. 4 is a perspective view of an unlocking mechanism shown in cross section in FIG. 2, FIG. 5 is a drawing in perspective partly broken away of a ball member and a socket member of the flexible column shown in FIG. 1 and FIG. 2, FIG. 6 is a partial longitudinal section of a preferred ball member and socket member, FIG. 7 is a vertical section through the lamp-housing shown in perspective in FIG. 1, FIG. 8 is a section through a heat sink comprising a bulb holder taken along the line 8–8 in FIG. 7, and FIG. 9 is a vertical section through another form of lamp housing and a preferred form of unlocking mechanism.

A flexible column 10 according to the present invention on which is supported a lamp-housing 11 is shown in FIG. 1. The flexible column 10 embodies a series of ball-and-socket joints. The joints extend from a base member 12 in which is located a cable-tensioning mechanism, to a member 13 housing an unlocking mechanism. The unlocking mechanism can be operated so to reduce the tension in a cable that the column can be bent into any required attitude. The unlocking mechanism housed in the member 13 can be operated by raising a lever 14. The lamp housing is attached to the member 13. A spigot base 15 is fixed to the base member 12, and can be engaged in an aperture of a plate (not shown) which may be clamped onto a machine tool. A screw is provided on the base member 12 with which an earth connection can be made, but is not shown for simplicity. An electric lead 16 enters the column by way of the base member 12.

The base member 12 of the flexible column is shown in section in FIG. 2 and from below in FIG. 3. A cable 17 is threaded through the flexible column 10 and enters the base member 12 through an aperture 18. In the base member 12 is a cable-tensioning mechanism including a guide 19 in the form of a quadrant, which forms part of the base member 12. The cable 17 is bent around the guide 19, and is terminated in an abutment 20, which may be in the form of a copper ferrule crimped to the cable. A U-shaped saddle 21 is placed over the cable and guide and can slide over the guide. One end of the saddle 21 contacts the abutment 20, and at its other end is contacted by a thrust washer 22 with which a setscrew 23 engages. The setscrew is engaged in a tapped aperture in the base member 12.

It will be apparent from FIGS. 2 and 3 that if the setscrew 23 is advanced to the left, then the saddle 21 similarly moves to the left, and thereby urges the end of the cable 17 in the same direction, to increase the tension therein. In this way the tension necessary to lock the flexible column 10 can be adjusted.

The base member is also provided with a recess 24 in which an electric lead 16 can be clamped. The electric lead can be located in channels 25 and led through an aperture and into the flexible column. Threaded apertures 26 allow a cover plate 15 to be bolted to the base member.

The flexible column 10 is locked by the tension applied to the cable by the tensioning mechanism described above. The flexible column can be unlocked and hence bent into a variety of attitudes if the tension is reduced. One mechanism for unlocking the flexible column is shown in a longitudinal section in FIG. 2 and in perspective in FIG. 4.

The mechanism shown enables the tension in the cable to be reduced when it is necessary to unlock the flexible column for repositioning. It is preferably situated at the end of the support remote from the base, since then only one hand is necessary to unlock and position the support column.

The cable 17 has a termination 27 forming an abutment for example a ferrule. The cable passes through an aperture 28 in a plate 29, which is urged against the abutment 27 by means of a spring in the form of a series of Bellville washers 30. The tension in the cable, provided by the first-mentioned mechanism reacts through the abutment and plate on the Bellville washers 30 compressing them. By counteracting the bias of the Bellville washers, some of the tension in the cable can be removed to unlock the column. A lever 14 is provided for this purpose which can be pivoted against a reaction block 31 retained in the member 13 by pins 32 of which only one is shown. The member 13 contains the Bellville washers 30 the plate 29 and the cable 17 which is led into the member 13 through an aperture 33. The lever 14 is generally of U-shaped with two inwardly directed lugs 14' and 14'' at the ends of the two limbs respectively of the lever. The lugs have a gap between them to clear the termination of the cable. In addition the two limbs are cranked through about 15° adjacent the two lugs whereby the end of each limb is provided with a toe and a heel. The toe engages the plate 29 and the heel engages the reaction block 31. When the outer end of the lever is raised, its inner end pivots on the heels of the two limbs, the toes of the two limbs depress the plate 39 against the Bellville washers 30 and in so doing reduce the tension in the cable. As long as the lever is raised, the column may readily be bent, and as soon as the lever is released, the Bellville washers so bias the plate against the termination of the cable that the initial tension is reapplied to the cable thereby relocking the flexible column.

A preferred form of unlocking mechanism is shown in FIG. 9. The housing 13 forms the uppermost socket of a series of ball-and-socket joints, which, as will be described later, form the flexible column 10. The housing 13 has an insert 101 secured therein forming a shoulder 102 against which the lowermost of the series of Bellville washers 30 abuts. A sleeve 103 is secured to the insert 101 by means of machine screws 104 and surrounds the Bellville washers. A spring-loaded member 29 is positioned within the sleeve 103 and is urged against the termination 27 by means of the Bellville washers 30. A rigid, fixed lever 105 is brazed or otherwise secured to the uppermost end of the sleeve 103.

The fixed lever 105 has an inner portion which is secured to the sleeve 103. The inner portion extends inwardly from the wall of the sleeve 103 so that its innermost edge projects beyond the center of the sleeve. The innermost edge is notched in order to clear the termination 27 on the cable 17. The inner portion of the lever is cranked at 106 so as to project obliquely upwardly out of the sleeve 103. The inner portion is again cranked at 108, and the lever is secured to the lamp housing 11 so as to extend along the base thereof. The extremity of the fixed lever 105 projects through an aperture 109 in the lamp housing 11.

A yieldable plastics member 110 e.g. of nylon is riveted to the bottom surface of the inner portion of the fixed lever. The inner end of a movable lever 14 is disposed between the yieldable member 110 and the spring-loaded member 29, the upper portion of the sleeve 103 being cut away to accommodate the lever 14 and allow the outer edge 112 of the yieldable member to project beyond the outer surface of the sleeve 103. When the lever 14 is raised to operate the unlocking mechanism, its heel portion thrusts against the yieldable member 110 adjacent its edge 112 and the toe depresses the spring-loaded member 29 against the Bellville washers. As shown in the drawing, a portion of the yieldable member adjacent the edge 112 is unsupported by either the fixed lever 105 or by a portion 113 of the lamp housing 11. The yieldable member therefore flexes on operation of the lever 14. With this arrangement damage to the lamp housing and rattle which could result if the lever 14 were in direct contact with the portion 113 is eliminated.

The lever 14 is retained within the housing 13 by means of projections (not shown), such as dimples, formed on one surface of the yieldable member 110, which engage corresponding apertures or depressions (not shown) formed in the appropriate surface of the lever 14.

The flexible column 10 in FIG. 1 is assembled from a series of ball-and-socket joints. Representative ball and socket members are shown in section in FIG. 2 and in perspective in FIG. 5. Each ball member 39 may be die-cast. It need not be a complete sphere but the surface in contact with a socket member 40 must lie in the surface of a sphere. The tensioned cable 17 passes through an aperture 41 in the center of each ball member. The aperture is tapered from a maximum diameter at each end to a minimum diameter at the center of the ball member as seen in FIG. 2. By shaping the aperture in this way and limiting the degree of tilt of each ball and socket the tension in the cable remains substantially constant despite changes in the curvature of the column. Preferably the taper is curved as shown to prevent damage to the cable. A flange 43 is provided projecting circumferentially from the ball member which limits the degree of tilt and prevents the edges 44 of adjacent socket members, between which each ball member is seated, from touching thereby eliminating the risk of damage to the seatings 47.

A further aperture, or apertures 42, is provided in each ball so that electric leads can be threaded through the apertures.

It is also necessary to limit the degree of twist of each ball member about the tensioned cable, otherwise excessive rotation of the column would damage or detach the electric leads from their connections at the ends of the column. Each ball therefore has a pin or pins 45 projecting on both sides of the said member which engage in loops 46, contained in the socket members 40 in which the ball member is seated, thus to limit the degree of twist of each ball member.

The socket members 40 shown in FIG. 2 and FIG. 5 have seatings which are made conical. A layer of a yielding material 47 such as leather or leatherette is bonded to each seating which increases the friction between each ball member and its seatings. Its purpose is to decrease the forces or pressures between each ball-and-socket joint necessary to lock the flexible column. Like the ball members 38, the socket members may be die-cast.

A preferred form of ball member 140 is shown in FIG. 6. The ball member 140 has a part spherical portion 141 which engages the socket member 40 in a conical seating having a layer of yielding material 47 bonded thereto. The ball member 140 has, at opposite ends, a cylindrical portion 142 which is arranged to project into the interior of each socket member 40. Tilting of the ball member 140 within its associated socket members 40 is limited by contact between the perimeter of the cylindrical portions 142 and the internal surface of the socket members. Clearly, the degree of tilt available is dependent on the diameter of the cylindrical portions 142 and the distance between their perimeters and the center of the ball, relative to the internal diameter of the socket members 40.

The ball member 140 has a pair of frustoconical counterbores 143 tapering inwardly and each extending towards the center of the ball member 140 from opposite ends thereof. An apertured-wall 144 separates the two counterbores 142, and the cable 17 and electric leads 16 are threaded through apertures 145 and 146 respectively. Conveniently, twin or multiflex electric leads are used with this type of ball member. The two apertures 145 and 146 each have curved tapers in the same manner as the aperture 41 of the ball 39 already described.

Twisting of the ball member 144 about the cable 17 is limited by means of pins 45 which project from the cylindrical portions 142 on both sides of the ball member. The pins engage loops 46 contained in the socket member 40. The loops 46, within which the pins 45 extend, can be closed as shown in FIG. 5; alternatively, however, a pair of converging arms (not shown) can be provided on the inner wall of the socket member 40, the pins 45 being positioned within a space between the two converging arms.

One form of lamp housing 11 is shown in section in FIG. 7. It is compact in design and is arranged to remain cool in operation. Because of these features a machine tool operator can if necessary place his face against the lamp, thereby obtaining a good view of, for example, a deep recess or hole in a workpiece.

A major problem is to obtain a high-intensity light which remains cool. In the present lamp a quartz-halogen bulb 48, rated at 12V is underrun from a conventional 10V stepdown isolating transformer (not shown). Underrunning the bulb reduces the heat generated, without unduly impairing the intensity, and also gives longer bulb life.

The bulb is located in a finned bulb holder 49 (FIG. 8) acting as a heat sink. The holder 49 is provided with a plurality of fins so that the heat generated by the bulb is conducted to the holder and is readily dissipated from its large area of surface. One connection to the bulb 48 leads through a spade terminal 50 to one pole of a robust rocker-type on/off switch 51. The other connection, to the lamp base, is through a cover plate 52 clamped to the bulb holder 49 by a screw 53. The electric leads 54 enter the lamp arrangement from the inside of the flexible column 10.

The bulb holder 49 is attached to a metal reflector 55 which is fixed to a glass lens 56 through a gasket 57. Since the glass lens tends to get warm a transparent cover plate 58 may be placed in front of the lens to prevent oily liquids splashing on the lens and drying thereon.

The lamp-housing is moulded in two parts, which are clamped together and to the member 13 housing the unlocking mechanism by a screw-and-boss 60, projections 61 from the moulding engaging a groove 62 in the member 13. A similar groove 63, not shown in FIG. 4 for simplicity encircles the member 13 so that additional equipment can be clipped on the column. Air can freely enter and leave the lamp-housing normally passing in through an opening in the lamp-housing adjacent the release lever 14 and passing out through a grill 64 in order to circulate around and cool the bulb holder 49. The grill is hinged in the housing so that the bulb can be replaced without dismantling the lamp assembly.

An alternative lamp housing is shown mounted on the preferred unlocking mechanism in FIG. 9. The alternative lamp housing has louvres 160, 164 and 166 formed on the top, rear and base surfaces of the housing 11 to allow circulation of air past the finned bulb holder 49. The louvres 164 form part of a rear plate 170 on which the rocker switch 51 and a bulb carrier 172 are mounted. The lamp carrier 172 may be made, for example from a reinforced plastics laminate such as glass/nylon, and is a sliding fit within a socket formed in the finned holder 49. A spring clip 174 releasably attaches the bulb 48 to the lamp carrier 172, and furthermore, the clip 174 provides one electrical connection to the bulb 48. A clamping screw 168 holds the rear plate 170 in position, the rear plate being removable complete with the bulb carrier 172 and bulb 48 to enable replacement of the bulb 48. The lamp housing is moulded with a socket portion 176 which fits over the sleeve 103 and can be securely retained thereon by means of a metal tube 178.

The electric lead 16 entering the base member 12 is secured in a recess 24 by a clamp (shown in FIG. 3) which comprises a group of at least three plates 65 each of which has an aperture 66 in which the lead is a close fit. The aperture in each plate is slightly offcentered. Thus, after threading the lead through each aperture in the group of plates the edges of the plates are aligned, for example by squeezing together in a vice, whereby each aperture will be staggered with respect to the aperture or apertures in the next adjacent plate or plates. The electric lead is thus deformed and thereby prevented from sliding through the clamp. Alignment of the group of plates can be retained by inserting pins 67 through further apertures in each plate. Rivets or other securing means known in the art may, of course, be substituted.

I claim:
1. A flexible column comprising:
    a series of ball members,
    a series of socket members each disposed between associated pairs of ball members to form a series of ball-and-socket joints,
    seatings provided in the socket members to accommodate said ball members,
    a tensioned flexible cable threaded through apertures in each ball member and through each socket member to urge said ball members against their said seatings,
    a termination on said cable,
    an abutment member abutting said termination,
    spring means loading said abutment member and tensioning said cable through the abutment between said termination and said abutment member, thereby locking the flexible column, a housing for said spring means, said housing having an aperture therethrough enabling the cable to extend through said housing, and unlocking mechanism operatively associated with said abutment member to counteract, at least in part, the bias provided by said spring means loading said abutment member, whereby operation of said mechanism unlocks the flexible column permitting adjustment thereof.

2. A flexible column as claimed in claim 1 in which the unlocking mechanism includes a lever one end of which engages said abutment member, said lever being arranged to pivot upon a reaction block and urge said abutment member against the spring bias.

3. A flexible column as claimed in claim 2 wherein said lever is of generally U-shape and has, on the ends of its two limbs, two inwardly directed lugs which engage said abutment member, said limbs being cranked adjacent the two lugs to form heels which provide pivotal engagement of said lever with said reaction block.

4. A flexible column as claimed in claim 1, wherein said unlocking mechanism includes a movable lever and a fixed lever, a yieldable plastics member being disposed between said two levers, said movable lever being pivotally disposed between said abutment member and the yieldable member whereby operation of said movable lever causes pivoting of said movable lever against said yieldable member resulting in yielding thereof, said movable lever urging said abutment member against the spring bias during the pivotal movement of said lever.

5. A flexible column as claimed in claim 1, wherein said housing includes an insert providing shoulders within said housing against which one end of said spring means abuts, the opposite end of thereof contacting said abutment member.

6. A flexible column as claimed in claim 1, wherein said spring means biasing said abutment member is a series of Bellville washers disposed, around said cable, within said housing.

7. A flexible column as claimed in claim 1, wherein said socket members have bearing surfaces which are conical and which are covered with a yielding material to increase the friction of said ball-and-socket joints.

8. A flexible column as claimed in claim 1, wherein said yielding material is leather.

9. A flexible column as claimed in claim 1, further including a further termination at the other end of said cable providing an abutment, a U-shaped saddle embracing said cable and abutting said further termination, and means provided to urge said saddle against said further termination, thereby tensioning said cable.

10. A flexible column as claimed in claim 9, wherein said U-shaped saddle is positioned within a base member of the flexible column having an aperture by means of which said cable enters said base member, said base member including a quadrant-shaped guide around which the cable adjacent its further termination bends substantially through a right angle.

11. A flexible column as claimed in claim 10, wherein the said means for urging said saddle against said further termination is a setscrew extending through a threaded bore in said base member, the setscrew carrying a thrust washer which bears against the end of said saddle remote from said termination.

12. A flexible column as claimed in claim 10, wherein said base member includes a clamp for an electric lead in which the insulating sleeve of said lead is deformed by said clamp, said clamp comprising at least three insulating plates each plate having an aperture in which said lead is a close fit, the apertures being staggered relative to one another.

13. A flexible column as claimed in claim 1, wherein the aperture in each ball member, through which said tensioned cable passes, is tapered from each end towards the center of said ball member with the smaller diameter towards the center of the ball member.

14. A flexible column as claimed in claim 13, wherein each ball has a further aperture and an electric lead passes through the further apertures, means being provided on one of said members of each ball-and-socket joint which project into means on the other member of said ball-and-socket joint adapted to limit relative rotation of the said two members about said cable by engagement with said projecting means.

15. A flexible column as claimed in claim 14, wherein said projecting means are pins which project on both sides of the ball member, said means adapted to limit relative rotation of the two members of each ball-and-socket joint comprising arms extending from the inner wall of the socket member and converging upon one another, said pins projecting into the space embraced by said arms.

16. A flexible column as claimed in claim 13, wherein said ball member is part-spherical and has a flange projecting circumferentially therefrom to limit the degree of tilt of said ball member relative to said cable.

17. A flexible column as claimed in claim 13, wherein each ball member of the said ball-and-socket joints has a part spherical portion and two cylindrical portions projecting in opposite directions from said spherical portion into said two socket members associated with each said ball member to limit the degree of tilt of the said ball member relative to said cable by said cylindrical portions contacting the inner surfaces of the said socket members.

18. A flexible column as claimed in claim 17, wherein each ball member has inwardly tapering frustoconical counterbores extending from said cylindrical portions towards the center of said ball member, said counterbores being separated by a wall having tapered apertures therein through which the cable and electric leads are threaded.